United States Patent [19]

Nishino et al.

[11] Patent Number: 4,757,579
[45] Date of Patent: Jul. 19, 1988

[54] BUCKLE FOR CHILD-RESTRAINING DEVICES

[75] Inventors: Syuzo Nishino, Kyoto; Naoki Morita, Nishinomiya, both of Japan

[73] Assignee: Ashimori Industry Co., Ltd., Osaka, Japan

[21] Appl. No.: 13,971

[22] Filed: Feb. 12, 1987

[30] Foreign Application Priority Data

Feb. 12, 1986 [JP] Japan .............................. 61-18681[U]

[51] Int. Cl.⁴ ............................................. A44B 11/25
[52] U.S. Cl. ...................................... 24/631; 24/637; 24/656
[58] Field of Search ................. 24/631, 643, 634, 637, 24/644, 656, 664

[56] References Cited

U.S. PATENT DOCUMENTS

| | | | |
|---|---|---|---|
| 3,404,439 | 10/1968 | Jones et al. | 24/637 |
| 4,062,091 | 12/1977 | Holmberg | 24/637 |
| 4,368,563 | 1/1983 | Lentz | 24/637 |
| 4,392,280 | 7/1983 | Gavagan | 24/637 |
| 4,457,052 | 7/1984 | Hauber | 24/656 |
| 4,575,908 | 3/1986 | Gloomis et al. | 24/637 |
| 4,624,033 | 11/1986 | Orton | 24/634 |

FOREIGN PATENT DOCUMENTS

| | | | |
|---|---|---|---|
| 118651 | 9/1984 | European Pat. Off. | 24/634 |
| 2231274 | 1/1974 | Fed. Rep. of Germany | 24/643 |

Primary Examiner—Victor N. Sakran
Attorney, Agent, or Firm—Birch, Stewart, Kolasch & Birch

[57] ABSTRACT

A buckle for child-restraining devices which includes a hook plate pivotally provided within a buckle body, the hook plate being formed with a belt-fastening portion and tongue-anchoring projections, characterized in that the belt-fastening portion is provided in a position where a rotation moment in a direction of the tongue-anchoring projections being pressed against the hook plate is generated on the hook plate when a tension force from the belt is exerted to the belt-fastening portion. The buckle for child-restraining devices has a lightweight, simple structure and enables a simple buckling operation with certainly, thus resulting in reduction of the cost for manufacture.

6 Claims, 4 Drawing Sheets

FIG. 4
FIG. 5
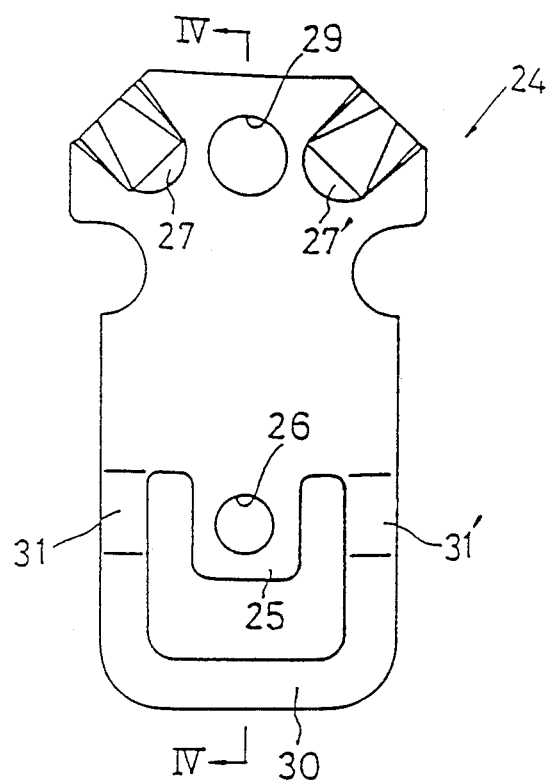
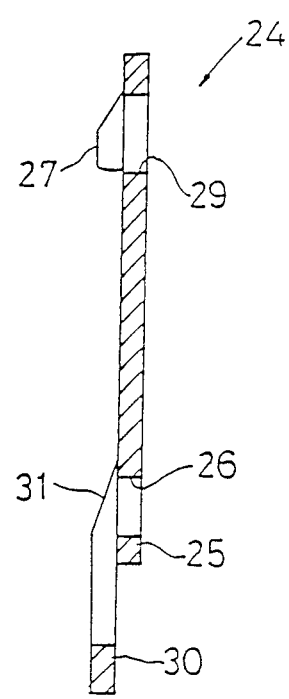

BUCKLE FOR CHILD-RESTRAINING DEVICES

BACKGROUND OF THE INVENTION

1. Field of the Invention

The present invention relates to an improved buckle involved in a child-restraining device for safely securing child in a vehicle and, more particularly, to an improved buckle for safety seat belts exclusively adapted to children in motor-vehicles which has a simple structure and enables an easy buckling operation for locking and releasing the devices.

2. Description of the Prior Art

In recent years, the use of a safety seat belt has been recommended or rather compulsorily required for seat occupants in motor-vehicles in many countries for preventing their injury or physiological damage caused by a traffic accident. Thus, various kinds of safety seat belts have been developed for drivers and their fellow passengers of motor-vehicles. These safety seat belts are designed chiefly for adult passengers and thus are not suited for child passengers because children are much smaller in body weight and size such that they cannot be entirely restrained with a safety seat belt designed for adults and thus may be thrown out of their seats in the case of a sudden stop or accident. Besides the ordinary safety seat belts designed for adult passengers, various kinds of child-restraining devices have been also developed hitherto, which are of the type adapted to restrain a child's body with a safety seat belt. These devices are usually placed on a seat in a motor-vehicle for holding the child with the safety seat belt. Among the child-restraining devices developed heretofore, those providing a childs seat in a smaller size which just fits the child's body and containing a plural of safety belts has now become popular and meets the requirements that child passengers are entirely restrained a the plurality of safety belts so that the impact force exerted at the time of an accident to the child passengers may be dispersed by the plurality of safety belts supporting the childs's body at several points. Thus, the prior art child-restraining devices include those having 2-, 3-, 4- and 5-point supporting belts among which, for example, a child-restraining device having 5-point-supporting belts can support a child's body at he crotch, both knees and both shoulders. Such a device is now widely employed. In such conventional child-restraining devices, those having 4- or 5-point-supporting belts comprise a waist belt using a 2-component buckle and shoulder belts stitched thereto, or shoulder belts having a ring attached to the front ends thereof by stitching and a waist belt inserted into the ring. Typical examples of the prior art child-restraining devices are disclosed, for example, in Japanese UM Publn. No. 57-2197, U.S. Pat. No. 4,457,052, Japanese Laid-open UM Appln. No. 60-192942 and U.S. Pat. No. 4,062,091. However, the prior art child-restraining devices having 4- or 5-point-supporting belts have some inherent problems. Thus these devices are complicated in structure and troublesome in their locking and releasing operations.

For example, a child-restraining seat disclosed in the above-mentioned Japanese UM Publn. No. 57-2197 is of a type having 3-points-supporting belts, wherein shoulder belts 7a and 7b are separately fastened, as shown in FIG. 1, to a T-shaped pad 10 capable of protecting the abdomen of a child passenger. The front ends of the shoulder belts 7a and 7b are connected together to a tongue 11 which is engageable with a buckle 12 mounted to the front lower part of a child seat 1. The buckle assembly consisting of the tongue 11 and the buckle 12 used in this seat utilizes an ordinary buckle for conventional safety seat belts for adult passengers. On practical use of this child seat, a child passenger must pass his/her head between the shoulder belts 7a and 7b which creates an unpleasant feeling for the child, making the seat troublesome in operation. A buckle for a child seat having 3-point-supporting belts as disclosed in the aforesaid U.S. Pat. No. 4,457,052 and a child-restraining device having 5-point-supporting belts as seen in Japanese Laid-open UM Appln. No. 60-192942 were devised to overcome the above-mentioned drawback. A new 3-component buckle not having been used in this art was developed therein for safety seat belts for children so that the belts can be fastened or unfastened without the necessity of passing the beltwearer's head between both shoulder belts.

For example, the buckle disclosed in Japanese Laid-open UM Appln. No. 60-192942 is a 3-component buckle wherein a combination of two tongue members is engageable with one buckle in such a manner that a tongue member 42 is inserted at the front end 42 thereof into an opening 50 of another tongue member 46 and the front end 42A of the tongue member 42 is then engaged with a buckle 54. The mechanism of the buckling operation in case of using this buckle is of the same type as used in an ordinary 2-component buckle. Thus, the use of this buckle is troublesome and difficult for children since the buckling operation has to be carried out in a specific sequence, i.e. by first combining the tongue member 42 with the tongue member 46 prior to the actual buckling operation.

On the other hand, the 3-component buckle disclosed in U.S. Pat. No. 4,457,052 has a unique structure and is featured as shown in FIGS. 4–6, by such a structure that a pair of hasps 30 and 32, to which over-the-shoulder straps 26 and 28 are fastened, respectively, through slots 38 and 40 formed in the hasps are engageable with a center plate 60 and a release plate 66 in the buckle body 36 in such a manner that bosses 68 formed on the release plate 66 protrude significantly through aperture 64 formed in the center plate 60 and enter in to openings 90 and 92 of the hasps 30 and 32, capable of receiving the load of the straps. In the locked state of this buckle, the bosses 68 protruding through the aperture 64 of the center plate 60 are engaged with the openings 90 and 92 of the hasps 30 and 32 whereby shoulders 94 of the bosses 68 abut against the edges of the openings 90 and 92 of the hasps 30 and 32 to block any reverse movement of the hasps in the outward unlocking direction while the other ends of the bosses 68 abut against the inside wall of the aperture 64 of the center plate 60 to engage the hasps 30 and 32 with the center plate so as to support the load of the straps. However, the bosses 68 are energized to enter in the locking position, i.e. into the openings 90 and 92 only by the resiliency of the compression springs 86, it is likely that the engagement between the bosses 68 and the openings 90 and 92 becomes so unstable as to cause disengagement when an unexpected impact load is applied to the buckle due to an accident. On actual use of the buckle, the two hasps 30 and 32 are inserted into a receiving slot 88 in any order of succession whereby each boss having a sloped surface 70, which is not parallel with the center plate 60, is brought into contact with the inserted hasp. In this case, the vector of the movement of the release plate acting at the contact point between the sloped surface and the hasp is not exactly vertical to the center plate 60 so that bore 84 and the edge of the release plate 66 tend to cause friction, as readily anticipated from FIG. 6, to disturb return of the release plate 66 to the original position. Thus, there is the problem that the function of the buckle becomes unreliable according to the manner of inserting the hasps into the receiving slot 88 of the buckle.

Thus, all of the prior art child-restraining devices using 2-, 3-, 4- and 5-point-supporting belts in combination with 2-, 3- and 4-component buckles involve problems, particularly in that the function of the buckle is unstable, the engagement of the buckle with the tongue plates on the front end of the belts must take place in a fixed sequence, and the weight of the deivce is so heavy as to make the buckling operation complicated and troublesome. From the viewpoint of protecting child passengers from injury or physiological damage caused by accident, therefore, there is a great demand in the automobile industry for developing a new type buckle for child-restraining devices devoid of the above mentioned drawbacks seen in the conventional child-restraining devices.

BRIEF DESCRIPTION OF THE INVENTION

Accordingly, it is an object of the present invention to provide a buckle for child-restraining devices which has a simple structure and functions with certainty.

It is another object of the present invention to provide a buckle for child-restraining devices which is lightweight and enables a simple buckling operation.

It is still another object of the present invention to provide a buckle for child-restraining devices which has 5-point-supporting belts and a 3-component buckle which is devoid of drawbacks as seen in the prior art buckles.

Other and further objects, features and advantages of the present invention will become more apparent from the following description.

DETAILED DESCRIPTION OF THE INVENTION

As a result of extensive research made by the present inventors to develop an improved buckle for child-restraining devices which is devoid of the drawbacks as seen in the conventional buckles, it has now been found that all of the drawbacks can be overcome and a lightweight buckle which is simple in structure and enables an easy buckling operation can be manufactured if a belt-fastening portion of a hook plate, pivotably provided within the buckle is positioned in a specific point in relation to the tongue-anchoring projections formed on the hook plate.

In accordance with the present invention, there is provided a buckle for child-restraining devices which includes a hook plate pivotally provided within a buckle body, the hook plate being formed with a belt-fastening portion and tongue-anchoring projections, characterized in that the belt-fastening portion is provided in a position where a rotation moment in a direction of the tongue anchoring projections being pressed against the hook plate is generated on the hook plate when a tension force from the belt is exerted to the belt-fastening portion.

In preferable embodiments of the present invention, the belt-fastening portion and the tongue-anchoring projections are formed on both ends of the hook plate and a fulcrum of the hook plate is provided at an intermediate position between the belt-fastening portion and the tongue-anchoring projections. The belt-fastening portion is preferably bent from the surface of the hook plate towards the side on which the tongue-anchoring projections are protruded. The hook plate is also pivotable in a lateral direction thereof and the two tongue-anchoring projections are protruded and spaced away from each other in widthwise direction of the hook plate. Basically, the buckle body comprises mechanical parts capable of engagement with the tongue plates and a protective plastic cover for the mechanical parts which may further be overlaid with a relatively soft resinous cover and is provided with a push button for disengaging the tongue plates from the buckle body. Thus, the buckle body cover is made of a resinous material which may further be covered with a protective soft resinous material, and on the other hand, the tongue plates exposed outside of the buckle in engaged state are also covered with a protective resinous material. The buckle body basal plate is integrally formed with the buckle body cover, and the buckle body and the tongue plates in locked state are arranged in such manner that the clearance between the resin-coated buckle body and the resin-coated tongue plates is so narrow that there is no danger of children's fingers being inserted and nipped between the buckle body and the tongue plates when the belts are kept in locked state.

The present invention can more fully be understood from the following description taken in conjunction with the accompanying drawings in which:

FIG. 4 is a front view of the hook plate shown in FIGS. 2 and 3.

FIG. 5 is a longitudinal, sectional view of the hook plate shown in FIG. 4 cut along line IV—IV.

Figure 1:
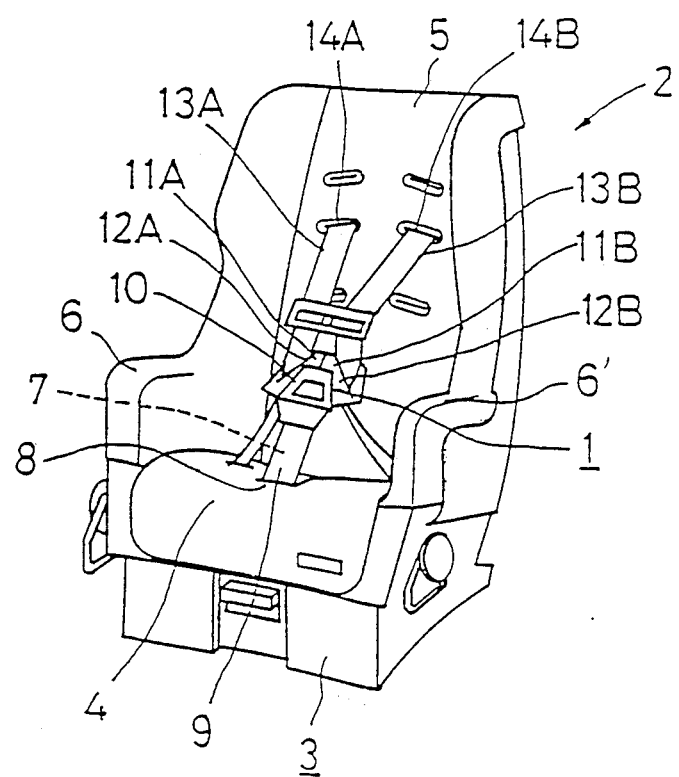
FIG. 1 is a perspective view of a child-restraining device wherein one example of the buckle of the present invention is used.

In FIG. 1 showing a general view of a child-restraining device using one example of the buckle 1 of the present invention, the child-restraining device 2 has a seat 3 capable of being located on a seat of a motor-vehicle, the seat 3 itself being commercially available and being integrally formed with a seat portion 4, a back 5 and arms 6 and 6'. Within the front end portion of the seat portion 4 is fixed an anchor plate (not shown) and a first belt 7 supported at its basal end by the anchor plate and extending outwardly from an opening 8 formed in a laterally central position of the front end portion of the seat portion 4. The outer periphery of the first belt exposed outside is covered with a belt cover 9. The buckle 1 is fastened to the front end of the first belt 7.

The buckle 1 has a pair of tongue plates 11A and 11B releasably provided relative to a buckle body 10. The tongue plates 11A and 11B have holder portions 12A and 12B made of a molded resin to which a second belt 13A and a third belt 13B are fastened, respectively. The buckle 1 is integrally joined within the seat portion 4 through openings (not shown) formed in both side portions thereof. The front ends of the second belt 13A and the third belt 13B are introduced into the back 5 through openings 14A and 14B formed in the front surface thereof and connected to winding devices within the back 5 through connectors (not shown). The structure of the buckle 1 will more clearly be understood from FIGS. 2 and 3.

Figure 2:
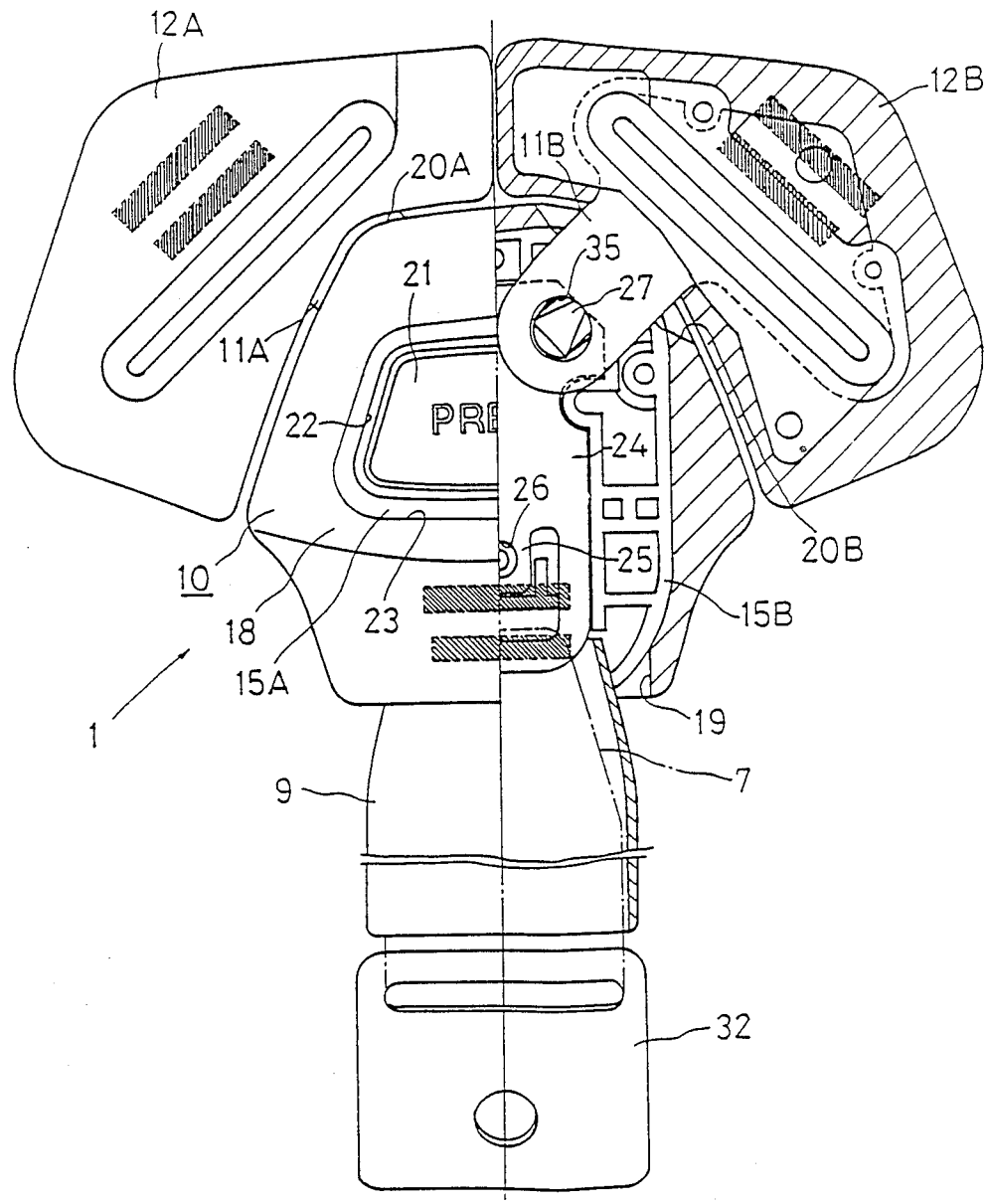
FIG. 2 is a half-sectional front view showing an example of the buckle of the present invention.
Figure 3:
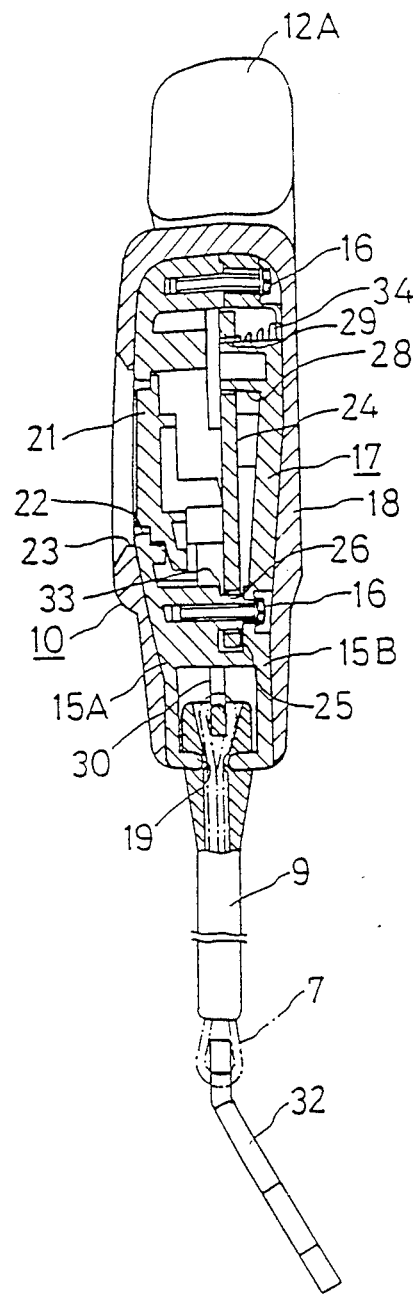
FIG. 3 is a longitudinal section, side elevational view of the buckle of the present invention shown in FIG. 2.

In FIGS. 2 and 3, the buckle body 10 of the buckle 1 has a cover 17 comprising a pair of cover bodies 15A and 15B connected by a plurality of screws 16. The outer periphery of the cover 17 is overlaid with a buckle cover 18. The cover 17 is formed at its basal end portion with an opening 19 for insertion of the first belt 7 and also at its front opposite shoulder portions with openings 20A and 20B for insertion of the tongue plates 11A and 11B. The surface of the cover body 15A of the cover 17 is provided with an opening 22 for the purpose of exposing a push button 21, and a similar opening 23 is formed in the corresponding portion of the buckle cover 19. A hook plate 24 generally shaped in a flat plate is disposed with the cover 17.

In FIGS. 4 and 5 showing the structure of the hook plate 24, a substantially square extension 25 is formed in a laterally central part at the basal end of the hook plate 24. At the center of the extension 25 is formed a circular hole 26 constituting a fulcrum for pivotally supporting the hook plate 24. On the other hand, tongue-anchoring projections 27 and 27' laterally space away from each other are formed in the other end portion of the hook plate 24. A circular hole 29 for a guide shaft 28 provided on the cover 27 is formed in a middle position between the tongue-anchoring projections 27 and 27'. On the basal end portion of the hook plate 24 where the extension 25 is formed, there is provided a substantially U-shaped belt-fastening portion 30 in the shape surrounding the extension 25. This belt-fastening portion 30 is formed by bending the hook plate 24 at the basal end portion in the same direction as shown by the tongue-anchoring projections 27 and 27'. The first belt 7 is fastened at its front end to the belt-fastening portion 30 and at its rear end to the anchor plate 32 as described above.

Within the cover 17, a pivot shaft 33 is inserted into the circular hole 26 of the hook plate 24 so that the hook plate 24 is pivotable around the shaft 33 in its longitudinal and lateral directions. Further, a pair of spiral springs 34 and 34 mounted on the inner surface of the cover 17 and abutting from the back of the tongue-anchoring projections 27 and 27' against the hook plate 24 to urge the latter towards the tongue-anchoring projections 27 and 27'. A push button 21 having a larger dimension than that of the opening 22 of the cover 17 abuts against the hook plate 24 in a position between the circular hole 26 and the tongue-anchoring projections 27 and 27'. Within the cover 17, the push button 21 is pushed outward and fitted into the opening 22 by the action of the spiral springs 34 and 34. On the other hand, a circular hole 35 is formed in the front end portion of each tongue plate 11A or 11B, into which the tongue-anchoring projection 27 of the hook plate 24 is fitted. The tongue plates 11A and 11B, the spiral springs 34 and 34, and the hook plate 24 are made of a metal or an alloy, but the cover 17, the buckle cover 18 and the holder portions 12A and 12B are usually made of a molded resin. It is preferable to use a soft resinous material for the buckle cover 18.

The buckling (locking and releasing) operation of the buckle of this invention is carried out in the following manner: In case the tongue plate 11A or 11B is engaged with the buckle body 10 by inserting the tongue plate into the opening 20A or 20B of the buckle body 10, the end portion of the hook plate 24 existing in the opening 20A or 20B is pivotally moved by the pressing force of the tongue plate 11A or 11B against the resiliency of the spiral spring 34 to permit intrusion of the tongue plate 11A or 11B to engage the circular hole 35 formed therein with the tongue anchoring projection 27 of the hook plate 24 thereby restraining the tongue plate 11A or 11B with the buckle body 10. When the other tongue plate 11B or 11A is inserted into the opening 20B or 20A after restraining the first tongue plate with the buckle body, the end portion of the hook plate 24 is similarly pivotally moved by the pressing force of the other tongue plate against the action of the spring 34 but at that time the hook plate 24 can also be pivotally moved in its lateral direction so that the tongue-anchoring projection 27 of the hook plate 24 which has already been fitted into the circular hole 35 of the first tongue plate is not pivotally moved from the direction of engaging the first tongue plate to the direction of disengaging it. Further, the tongue-anchoring projection 27 and the circular hole 35 already engaged with each other are not disengaged on insertion of the other tongue plate. In this manner, the tongue plates 11A and 11B can be inserted in any order of succession or simultaneously into the openings 20A and 20B to secure a stable locking of the belts in a simple manner.

In the present invention, it is one of the characteristic features that the belt-fastening portion 30 of the hook plate 24 is formed by bending or offsetting the basal end portion of the hook plate 24 to be positioned in a point where a rotation moment in a direction of the tongue-anchoring projections being pressed against the hook plate is generated on the hook plate when a tension force is exerted to the belt-fastening portion. In the event a tension force is applied, for example, to the first belt 7 during the actual use of the child-restraining device provided with the buckle of this invention is then exerted to the belt-fastening portion of the buckle, a rotation moment in the direction of the tongue-anchoring projections 27 and 27' being further pressed against the tongue plates 11A and 11B (in the counter-clockwise direction in FIG. 3) is generated in the hook plate 24 since the belt-fastening portion 30 is bent to such specific position away from the plane of the hook plate 24. Thus, the buckle of the present invention has such a specific mechanism that when a load is applied to the belt-fastening portion 30 supporting the belt, the hook plate 24 is moved pivotally around the hole 26 functioning as a fulcrum to a direction of the tongue-anchoring projections 27 and 27' being further pressed against the tongue plates. As the hook plate 24 is movable pivotally around the guide shaft 28 functioning as a fulcrum, the hook plate makes no friction contact with the cover 17 or the like unlike the case of the buckle disclosed in U.S. Pat. No. 4,457,052. According to the buckle of the present invention, therefore, disengagement of the tongue plates from the buckle body is entirely prevented and the safety of the restrained child is maintained even when a strong tension force is applied to the belts.

In order to release the tongue plates 11A and 11B from the buckle body 10, it is only required to push the push button 21 with a finger. By so doing, the hook plate 24 is pivotally moved against the action of the spiral springs 34 and 34 in the clockwise direction in FIG. 3 whereby the tongue-anchoring projections 27 and 27' are retracted to a position where they are disengaged from the circular holes 35 and 35 of the tongue plates 11A and 11B. Thus, the tongue plates 11A and 11B can freely be pulled out of the buckle body 10.

In addition to the advantage in the buckling operation such that the locking and releasing operations of the tongue plates can be performed with certainty in a simple manner, it is also an additional advantage of the present invention that the number of the parts can be reduced to make the buckle lightweight and the structure simple. This apparently results in making the buckling operation simple and the cost for the manufacture cheaper.

In addition, the buckle body cover further covered with a protective soft resinous material can be used as a pad for protecting the abdomen of child passengers.

In the above-described example, the present invention has been described with reference to the 3-component type buckle 1 wherein the buckle body is engaged with two tongue plates. It is to be construed that the present invention is not limited to the use of such 3-component buckle but a variety of other kinds of buckles including 2-component or 4-component buckles can be used for the present invention.

As the buckle of the present invention succeeds in overcoming all the drawbacks as seen in the conventional buckles by a combination of the specific devices and requires no extra expenses for its production, the buckle of the present invention finds a wide advantageous utility, especially in the automobile industry for protecting child passengers from injury or physiological damage caused by traffic accidents.

What is claimed is:

1. A buckle for use in connection with child restraining devices which comprises
    a buckle body,
    a hook plate pivotally disposed within said buckle body, said hook plate containing a belt - fastening portion and tongue - anchoring projections formed at opposite end portions of the hook plate, respectively with a fulcrum of the hook plate being provided at an intermediate position between the belt - fastening portion and the tongue - anchoring projections, said belt-fastening portion being off-set from the surface of the hook plate in the same direction as the protrusions of the tongue anchoring projections, wherein a rotational movement in the direction of the tongue anchoring projections being pressed against the hook plate is generated in the hook plate when a tension force from the belt is exerted on the belt-fastening portion.

2. The buckle according to claim 1, wherein the hook plate is pivotable in both lengthwise and lateral directions thereof and the tongue-anchoring projections are protruded and spaced away from each other in the widthwise direction of the hook plate.

3. The buckle according to claim 1, wherein the buckle body has a cover made of a resinous material and a basal plate made of a resinous material, the buckle body cover being formed integrally with the basal plate.

4. The buckle of claim 5 wherein the tongue-anchoring projections are adopted to receive tongue plates attached to restraining belts.

5. The buckle of claim 8 wherein spring means are operatively associated with the hook plate for biasing the tongue-anchoring projections of the hook plate into operative engagement with the tongue plates and a push button is disposed in the buckle body and in operative engagement with the hook plate whereby upon the pressing of the push button, the hook plate is pivotally marked against the bias of the spring means whereby the tongue-anchoring projections are retracted to a position where they are disengaged from the tongue plates, thereby releasing the tongue plates from the buckle body.

6. The buckle according to claim 4, wherein the buckle body cover is further covered with a protective soft resinous material and the tongue plates exposed outside the buckle in engaged state are also covered with a protective soft resinous material.

* * * * *